United States Patent [19]
Robinson

[11] Patent Number: 6,016,161
[45] Date of Patent: Jan. 18, 2000

[54] METHOD AND SYSTEM FOR AUTOMATICALLY CALIBRATING A COLOR-BASED MACHINE VISION SYSTEM

[75] Inventor: David A. Robinson, Northants, United Kingdom

[73] Assignee: Medar, Inc., Farmington Hills, Mich.

[21] Appl. No.: 09/053,595

[22] Filed: Apr. 1, 1998

Related U.S. Application Data

[63] Continuation-in-part of application No. 08/591,130, Jan. 25, 1996.

[51] Int. Cl.[7] .................................................. H04N 17/00
[52] U.S. Cl. ........................ 348/187; 348/180; 358/504; 358/518
[58] Field of Search ................................... 348/187, 188, 348/175, 176, 93, 652–658, 180–182, 222, 242, 256, 263, 578, 86; 345/904; 358/504, 518; 382/162, 167

[56] References Cited

U.S. PATENT DOCUMENTS

| | | |
|---|---|---|
| 5,159,185 | 10/1992 | Lehr . |
| 5,179,437 | 1/1993 | Kawada et al. . |
| 5,202,767 | 4/1993 | Dozier et al. . |
| 5,216,504 | 6/1993 | Webb et al. . |
| 5,231,481 | 7/1993 | Eouzan et al. . |
| 5,293,225 | 3/1994 | Nishiyama et al. . |
| 5,327,226 | 7/1994 | Tanabe . |
| 5,363,318 | 11/1994 | McCauley . |
| 5,386,299 | 1/1995 | Wilson et al. .......................... 358/406 |
| 5,442,408 | 8/1995 | Haruki et al. . |
| 5,444,481 | 8/1995 | Oshima et al. .......................... 348/187 |
| 5,481,302 | 1/1996 | Yamamoto et al. . |
| 5,694,227 | 12/1997 | Starkweather .......................... 358/504 |
| 5,767,980 | 6/1998 | Wang et al. ............................ 358/298 |
| 5,801,962 | 9/1998 | Sheu et al. .............................. 364/526 |
| 5,867,211 | 2/1999 | Weideman et al. ..................... 348/187 |

*Primary Examiner*—Andrew I. Faile
*Assistant Examiner*—Habte K. Bahgi
*Attorney, Agent, or Firm*—Brooks & Kushman P.C.

[57] ABSTRACT

A calibration algorithm is provided for calibrating a machine vision system including a color camera, a framegrabber and an illumination source wherein subsequently acquired images are processed on a pixel-by-pixel basis. After framegrabber offsets are measured to obtain initial or offset calibration data, the camera is pointed at a target monotone patch of known reflectance such as pure white and the camera outputs for red, green and blue are determined while observing the monotone patch to obtain spatial calibration data. The gain for each of the output channels of the color camera is automatically determined from the initial calibration data. Applying the three gain factors to a subsequent image on the pixel-by-pixel basis allows one to end up with a color-corrected image without incurring any time performance penalty. At any time during an inspection process, a small area of white reflectance can be observed. The resulting dynamic white calibration data is used to correct for any medium to long term temporal variation in imaging conditions.

18 Claims, 3 Drawing Sheets

METHOD AND SYSTEM FOR AUTOMATICALLY CALIBRATING A COLOR-BASED MACHINE VISION SYSTEM

CROSS-REFERENCE TO RELATED APPLICATION

This application is a continuation-in-part to U.S. patent application entitled "Method and System for Automatically Calibrating A Color Camera In A Machine Vision System", filed Jan. 25, 1996 and having U.S. Ser. No. 08/591,130.

That application describes an automatic calibration methodology which provides the ability to compensate for variations in the color temperature of an illumination source and the statistical process by which the color characteristics of the image being grabbed by the machine vision system could be compared with a perfectly color balanced version of the same image. The grabbed image then being processed so that the color balance of the incoming images matches that of the template image.

That application also describes an algorithm where a master comparison image is defined to be an area of featureless white, and correction factors required to compensate for color channel gains are directly computed from that section of the image. This algorithm is very effective in removing gain variations from the image capture chain and ensuring consistent imaging results from a number of imaging stations. However, many of the imaging artifacts described hereinbelow are not dealt with and often their effects, such as nonuniform spatial and temporal illumination and offset in the frame store, can so severely damage the fidelity of the captured image as to render the result of any color measurement taken from the system unusable.

1. Technical Field

This invention is related to methods and systems for automatically calibrating a color-based machine vision system and, in particular, to methods and systems for automatically calibrating a color-based machine vision system including a color camera.

2. Background Art

Sources of Imaging Inconsistencies

FIG. 1 shows the key components within an imaging chain which can severely effect the integrity of the color rendition of an image captured by a prior art machine vision system, generally indicated at 10.

For ease of explanation, a framegrabber, generally indicated at 12, is shown as a separate entity to a computer system 16, however, it is normally a single plug-in board that is actually positioned within the system 16. In this structure, the vision system 10 itself is considered as a totally digital system. Although a monitor 14 which displays a target will almost undoubtedly introduce color distortion, the monitor 14 does not represent a problem in the machine vision context, which makes its decisions on the digital version of an image stored within memory (not shown) within the computer system 16. The monitor 14 merely provides a convenient instrument with which to display the image to a human observer.

Framegrabber-Induced Artifacts

The framegrabber 12 can be responsible for three independent image artifacts, these being:

1. Digitization noise;
2. Color channel gain errors; and
3. Color channel offset errors.

There are two distinct types of digitization noise, these being sample rate jitter, and quantization error. Sample rate jitter is caused by an inaccurately timed and jittering sample rate clock. This has the effect of producing irregular sampling along the incoming video signal; and results in geometric distortion of the sampled image. Quantization error is invariably caused by either insufficient number of bits in built-in, analog-to-digital converters (ADC's) 18, or the input analog signal only fills a small fraction of total ADC range.

The digitization noise is not, in general, amenable to algorithmic correction. However, for completeness, one can say very little can be done for the sample rate jitter, other than replacing the framegrabber 12 with one of better quality.

As far as quantization error is concerned, in order to prevent it being noticeable by the human observer, the image must be capable of sampling the image with at least 7 bits or more (commonly 8 bits) If the framegrabber 12 doesn't meet this requirement, then one can simply replace it with one that does. If the framegrabber 12 purports to support sufficient dynamic range to avoid quantization error, but it still occurs, then this is strong evidence that the incoming video signal is not filling the ADC dynamic range. This should be corrected by adjusting the overall analog gain of the system 10.

The analog gain of the framegrabber 12 has significant effect on the overall color balance of the resulting digital image. Amplifiers 20 on some framegrabbers, such as the framegrabber 12, introduce a DC offset to the video signal prior to being digitized. For conventional video applications, this small offset is completely irrelevant. However, in the machine color vision field where a camera, generally indicated at 22, is being used as a color measurement tool, color channel differential offset can significantly interfere with the saturation value determined by the system 10. This is true even though hue, saturation and intensity theoretically represent three orthogonal axes of a color space, and are thus totally decoupled. Even a low level color channel differential offset can completely destroy any independence between the intensity and saturation axis.

Camera-Induced Artifacts

The camera 22 has been developed primarily as part of an image transmission system which can take a scene at one location and generate an aesthetically pleasing reproduction of the scene on the monitor 14. Consequently, the camera 22 has not been designed for accurate color measurement. Prior to using the color camera 22 in a measurement mode, care must be taken to see if the camera 22 has a switchable "gamma" function. Although the CCD sensors used within the camera 22 are implicitly linear, the electronics are provided with a "gamma" transfer function which is essentially a non-linear component which, when combined with the non-linearity found in most monitors such as the monitor 14, tend to produce an overall linear image transmission system. However, for color monitoring work a "non-linear" image sensor is the last thing that is needed. The switchable "gamma" function enables this non-linearity to be switched off at the camera 22 thus producing a linear sensor.

Invariably, good quality cameras provide the ability to adjust the relative gains between the individual color channels, as illustrated by amplifiers 24 of the camera 22. For example, the Sony 3ccd camera provides a fixed gain on the green channel and a user variable gain on the red and blue channels. The gains can be adjusted automatically using a built-in white balance control, which can be used simply by pointing the camera at a totally white target and initializing a white balance operation. Alternatively, the gains can be controlled manually.

The effect of adjusting these gains is virtually identical to adjusting the amplifiers 20 within the framegrabber 12. Care must be taken to set up the system 10 initially with fairly balanced gain distribution between the camera 22 and framegrabber 12. If the camera gain is set too high, and this is compensated by a much lower gain in the framegrabber 12, then the system 10 can run into problems with the camera amplifiers 24 saturating.

Illumination-Induced Artifacts

A source 26 for illuminating a target 28 being imaged is one of the most crucial areas which can make or break a machine vision application. The problems include:

Color temperature effects on color rendition;
Non-uniform illumination distribution;
 1. Spatially distributed unevenness in illumination level,
 2. Spatially distributed unevenness in spectral content,
Temporal changes in illumination (short term);
Temporal changes in illumination (long term);
 1. Changes in illumination level,
 2. Changes in spectral content.

The term "color temperature" is derived from the relative spectral distribution of energy in the red, green, and blue regions of the spectrum, and is related to the temperature of a hot black body whose spectral distribution approximates to the light source. Experience tells us that at relatively low temperatures, such a black body becomes "red hot" where most of the energy within the visible region of the spectrum is emitted in the red region. As the temperature increases, the object becomes "white hot" as more of the radiation moves toward the shorter wavelengths. At very high temperatures the light starts to appear very blue.

This effect has crucial implications when attempting to use camera 22 as a color measuring sensor. On initial set up, the camera 22 can be adjusted to the color temperature of the supplied illumination source 26 by modifying the individual color channel gains such that imaging a white surface of a target 28 results in equal signals from the red, green, and blue video channels.

Non-uniform illumination from the light source 26 can produce two effects which often occur together. That is, spatial variation of the illumination intensity and spatial variation of perceived color temperature. In practice, a great deal of effort would be applied in designing a uniform illumination field, since illumination variation gets directly mapped into the image of the target 28 being inspected.

Short term light source temporal variations refer to the implicit 100 Hz (Europe) or 120 Hz (USA) oscillation found on many mains-driven illumination sources. At this speed, which is in both cases almost exactly twice the video frame rate, apparent spatial variations in illumination level are guaranteed during an image grab. The most common way to avoid this problem is to use either a light source powered by DC or one powered by a very high frequency AC such that the frame rate of the camera tends to "integrate" out the variation over many power line cycles.

Long term temporal variations both in illumination level and in color temperature can occur in many light sources. For example, long term drift in the power supply driving the light source 26 can change both the intensity, and the color temperature of the source 26. Similarly, simple aging of the light source 26 can provide similar effects, perhaps as material from the lamp filament gets deposited onto the lamp envelope, and the source 26 itself runs hotter due to the loss of filament material.

The U.S. patent to Yamamoto et al. (U.S. Pat. No. 5,481,302) describes a method and system for adjusting the white balance of a color video signal which makes extensive use of analog techniques and is designed to run in real-time. The Yamamoto et al. system does its job as long as the color balance of its imaging system is substantially perfect. The Yamamoto et al. system is optimized to operate on a stand-along camera system.

The U.S. patent to Eouzan et al. (U.S. Pat. No. 5,231,481) discloses a projection display device which can only work provided that its color camera, which is used as a servo sensor, is itself perfect. Any loss of color fidelity in the camera is directly reflected in the quality of the overall display.

The U.S. patent to Haruki et al. (U.S. Pat. No. 5,442,408) is entitled "White Balance Adjusting Apparatus for Automatically Adjusting White Balance in Response to Luminance Information Signal and a Color Information Signal Obtained From Image Sensing Device." A color evaluating value correcting circuit determines whether the color evaluating values are within a predetermined color temperature distribution range. If not, adjustments are made to automatically bring these values within the desired range. Gain control circuits control the gains of the amplifying circuits so that picture color evaluating values are normalized.

The U.S. patent to Dozier et al. (U.S. Pat. No. 5,202,767) is entitled "Multimode Computerized Multicolor Camera and Method Therefor." The system described therein has the following features: 1) a computerized multicolor camera operates over a wide range of light levels; 2) there is an exact frame-to-frame registration of all colors of the multi-color image of a defined object without pixel jitter; 3) irregularities in the image sensor (the camera) are compensated for. The computer control for this device is internal. Digital representation of images are generated by the camera at the three primary colors (red, green and blue). An amplification and designation circuit allows for the photometric compensation of the uncompensated pixel values using a compensation table and allows for the storage of a compensated digital signal representation of an image in digital memory.

The U.S. patent to McCauley (U.S. Pat. No. 5,363,318) is entitled "Method and Apparatus for Adaptive Color Characterization and Calibration." A device described therein functions to provide a system which independently corrects the color channels by providing independent color correction curves which together are constrained to provide a color balanced response. In addition, this system simultaneously corrects for saturation effects and linearizes device response in an effort to utilize the entire dynamic range of the sensing device. A typical system as envisioned in the primary embodiment will utilize a personal computer such as an IBM or an Apple.

The U.S. patent to Tanabe (U.S. Pat. No. 5,327,226) is entitled "Method and System for Automatically Adjusting Color Balance of a TV Camera." The device described therein provides for an automatic color setup system in which a white level, a black level, and a grey level are determined by analysis of image signal data derived from a standard image. These values are supplied to a CPU through a buffer memory. The CPU includes a division processing section, an adequate block selecting section, a measurement region determining section and a color balance adjusting section.

The U.S. patent to Nishiyama et al. (U.S. Pat. No. 5,293,225) is entitled "Digital Signal Processing System for a Color Camera Apparatus Including Separate Delays for Color Signal and Brightness Signal Processing." An auto signal processing circuit receives presently processing signal amplitude data from a brightness signal processing circuit and a color signal processing circuit, and outputs system control data to a microcomputer via a data bus.

The U.S. patent to Lehr (U.S. Pat. No. 5,159,185) is entitled "Precise Color Analysis Apparatus Using Color Standard." Digital signals are sent to a computer which first averages the output signals of the camera in each of the color channels for that portion of the camera output signal which represents the location of the standard tile, and then compares at least one of the averaged camera signals to information in the computer memory which has been derived from previous readings for the standard tile. If the average camera signal does not match the information in the computer memory, the computer sends signals to the lamp control circuit which adjusts the lamp output to the appropriate direction and amount until the averages camera signal information is matched.

The U.S. patent to Kawada et al. (U.S. Pat. No. 5,179,437) is entitled "Apparatus For Color Correction Of Image Signals Of A Color Television Camera." A CPU compares an image signal obtained by processing a pick-up signal with an image signal from the test chart signal-generating circuit. A color correction circuit takes the results and makes the appropriate corrections. Furthermore, Kawada et al. is similar to Yamamoto et al. in that its camera correction is designed to be undertaken in real-time and correction electronics are continuously adjusted. Kawada et al. relies on exact optical match between a synthetic image and an optical image.

The U.S. patent to Webb et al. (U.S. Pat. No. 5,216,504) is entitled "Automatic Precision Video Monitor Alignment System." A pickup camera transmits a digital signal to a calibration computer via a video co-processor subsystem. This system functions to precisely align all the adjustable display characteristics of a video monitoring system. To allow for accurate tracking of color temperature at any brightness or contrast setting, 12 adjustments are made for each desired color temperature. These are divided into four (4) groups for each color (red, green and blue): Brightness Maximum, Brightness Minimum, Contrast Maximum and Contrast Minimum. The amount of each is precisely set for the proper color temperature.

SUMMARY OF THE INVENTION

An object of the present invention is to provide a computer-controlled method and system for calibrating a machine vision system including a color camera such as a RGB camera wherein any images captured by the machine vision system are processed on a pixel-by-pixel basis rather than on a per image basis without incurring any run time performance penalty to produce consistent and repeatable results. This maintains image compatibility between multiple machine vision systems irrespective of inconsistency in the initial machine vision system setup or subsequent aging of crucial components within the machine vision system.

Another object of the present invention is to provide a computer-controlled method and system for calibrating a machine vision system including a color camera such as a RGB camera to overcome problems caused by errors in setting up color balance, different image exposure and differences in color temperature of any illumination used. These image differences can be critically important when the system is being used to ensure color consistency between products from different manufacturing sites.

Still yet another object of the present invention is to provide a computer-controlled method and system for calibrating a machine vision system including a color camera such as a RGB camera wherein sources of imaging inconsistencies such as a framegrabber, the color camera and an illumination source are compensated for.

In carrying out the above objects and other objects of the present invention, a method is provided for automatically calibrating a machine vision system including a color camera having output channels and a computer having a memory. The method includes the steps of providing a first set of calibration data and a calibration target having a monotone region of known reflectance and utilizing the color camera to generate a target image containing the target with the monotone region for each of the output channels. The method further includes the step of measuring an output of each of output channels during the step of utilizing to obtain output measurements. The method includes the steps of computing a second set of calibration data from the output measurements and the first set of calibration data and storing the second set of calibration data in the memory. The second set of calibration data is applied by the computer to each subsequent image acquired by the camera on a pixel-by-pixel basis to obtain a color-corrected image.

Further in carrying out the above objects and other objects of the present invention, a system is provided for carrying out each of the above-noted method steps.

In further carrying out the above objects and other objects of the present invention, a method is provided for automatically calibrating a machine vision system including a color camera having output channels and a computer having a memory. The method includes the steps of generating a first set of calibration data based on a black level of each output channel. The method further includes generating a second set of calibration data based on the first set of calibration data and a first target image containing a calibration target with a monotone region. The method also further includes operating the machine vision system utilizing the second set of calibration data to obtain color-corrected images. The method also includes the step of generating a third set of calibration data based on a second target image containing a target with a white region during the step of operating. Finally, the method includes the step of storing the third set of calibration data in the memory. The third set of calibration data is applied by the computer to each subsequent image acquired by the color camera on a pixel-by-pixel basis to obtain a color-corrected image which is also corrected for medium-to-long term temporal variations in imaging condition.

Further in carrying out the above objects and other objects of the present invention, a system is provided for carrying out each of the above-noted method steps.

The above objects and other objects, features, and advantages of the present invention are readily apparent from the following detailed description of the best mode for carrying out the invention when taken in connection with the accompanying drawings.

BEST MODES FOR CARRYING OUT THE INVENTION

Figure 1:
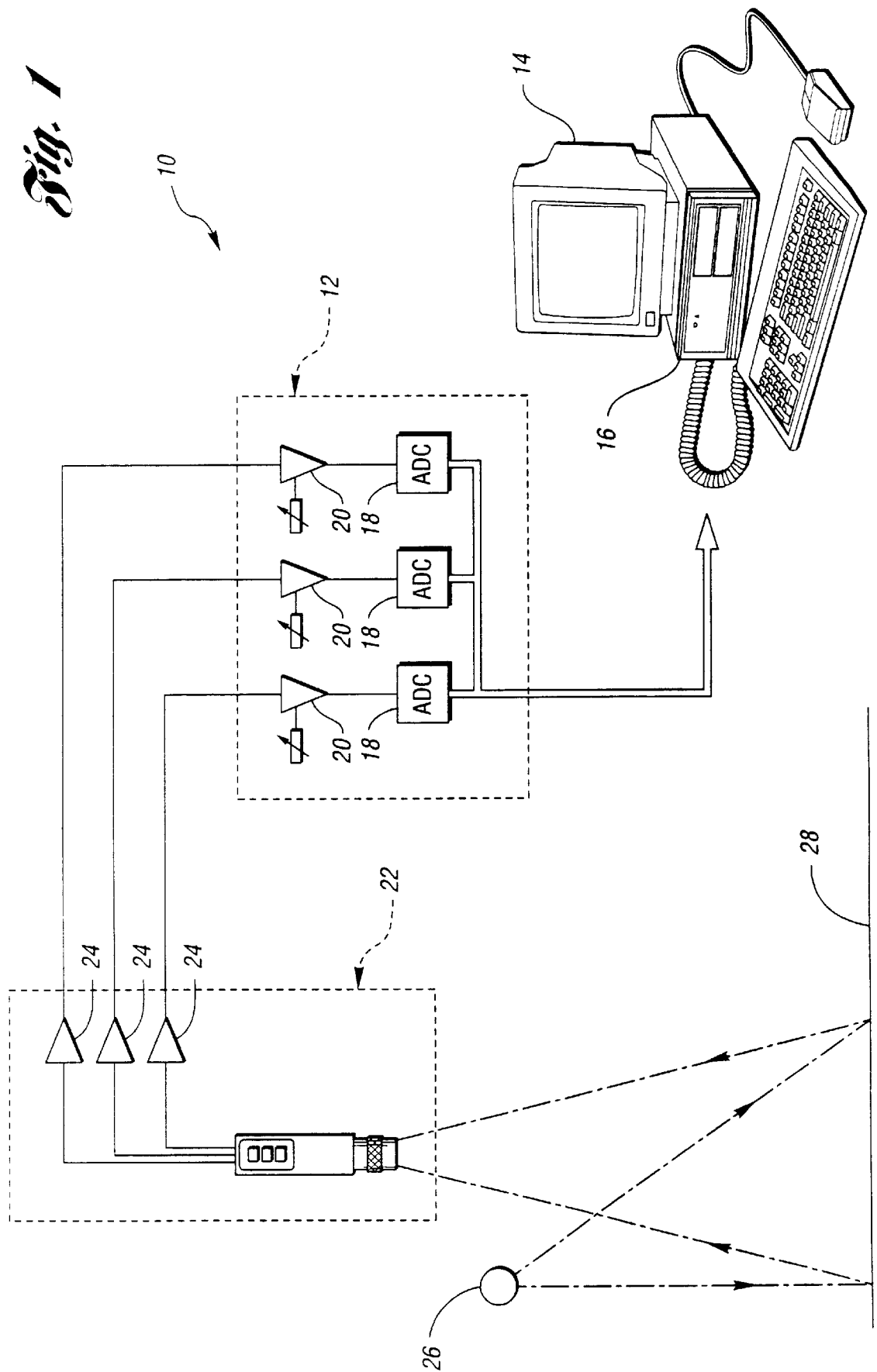
FIG. 1 is a schematic diagram illustrating a prior art machine vision system which the method and system of the present invention can automatically calibrate.
Figure 2:
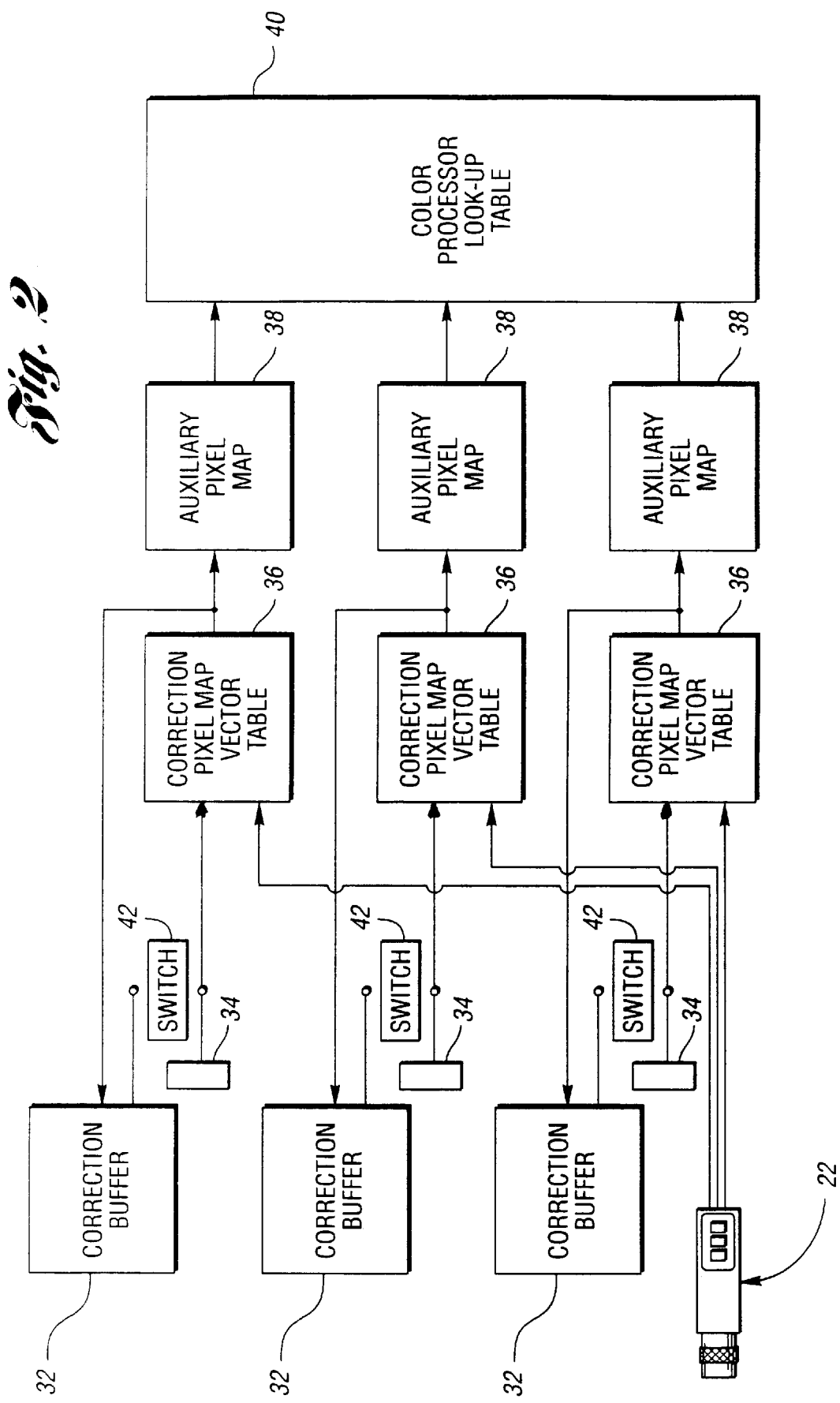
FIG. 2 is a block diagram illustrating three parallel subsystems of the system of the present invention.

Referring now to FIG. 2, there is illustrated schematically a system, generally indicated at 30, of the present invention which can automatically calibrate the machine vision system 10 of FIG. 1. While RGB cameras are most widely used in such a system 10, the method and system of the present invention could also be used with cameras having other types of channels such as Cyan, Magenta and Yellow channels. The camera 22 may be an image source such as an analog, digital or line scan camera such as RS-170, CCIR, NTSC and PAL.

The system 30, which preferably takes the form of an appropriately programmed computer such as the computer 16, includes three parallel subsystems. Each subsystem includes an 8 bit wide correction buffer 32 of sufficient capacity to hold one complete image. Each subsystem also has a single location 8 bit constant register 34. The contents of either the correction buffer 32 or the constant register 34 of each subsystem can be switched through to one-half of a correction pixel map vector table (CPMVT) 36. The other half being supplied by either the digitized red, green or blue image data taken from the camera 22 (via the framegrabber 12, not shown in FIG. 2). Each correction pixel map vector table 36 has, for example, a capacity of 65536 bytes. The output from each 8 bit CPMVT 36 is connected to the input of an optional auxiliary pixel map vector table or module 38 of its corresponding subsystem and then these outputs go on to a single optional color processor look-up table 40.

The image digitizer/frame grabber 12 may be a conventional frame grabber board such as that manufactured by Matrox, Cognex, Data Translation or other frame grabber.

OVERVIEW OF THE INVENTION

In the majority of machine vision applications, the information being sorted is that of either a reflectance or transmissivity matrix of the object 28 being imaged. This matrix is spatially distributed over x and y. This can be represented as:

InformationMatrix=$\rho(x,y,\lambda)$ where $\lambda$ is the wavelength.

Although the matrix may be continuous function in wavelength, it is normally sampled in three places, these being red, green and blue:

InformationMatrix$_r$=$\rho_r(x,y)$
InformationMatrix$_g$=$\rho_g(x,y)$
InformationMatriX$_b$=$\rho_b(x,y)$ Although this is the information that is required, what is actually received by the machine vision system 10 can be approximated by the following:

$I_r(x/y)=((P_r(x,y) * \rho_r(x,y) * G^c_r)+\text{Offset}^f_r)*G^f_r$
$I_g(x,y)=((P_g(x,y) * \rho_g(x,y) * G^c_g)+\text{Offset}^f_g)*G^f_g$
$I_b(x,y)=((P_b(x,y) * \rho_b(x,y) * G^c_b)+\text{Offset}^f_b)*G^f_b$ Here, $I_x$ is the measured pixel intensity;

$P_x$ is the illumination output power in the respective wavelength range;

$P_x$ is the reflectance/transmissivity matrix of the target object 28;

$G^c_x$ is the video gain of the camera 22 in the specified waveband;

Offset$^f_x$ is the framegrabber offset in the specified waveband; and $G^f_x$ is the framegrabber gain in the specified waveband.

This equation can be transposed to give the following relationship:

$$\rho_r(x,y) = \frac{(I_r(x,y) - \text{Offset}^f_r * G^f_r)}{P_r(x,y) * G^c_r * G^f_r}$$

$$\rho_g(x,y) = \frac{(I_g(x,y) - \text{Offset}^f_g * G^f_g)}{P_g(x,y) * G^c_g * G^f_g}$$

$$\rho_b(x,y) = \frac{(I_b(x,y) - \text{Offset}^f_b * G^f_b)}{P_b(x,y) * G^c_b * G^f_b}$$

Now suppose that one shuts the camera iris right down so that no light reaches its CCD array. In other words, wind the camera aperture down and look at a full frame and measure the "black level" on each input channel to obtain offset calibration data. This is clearly equivalent of having a $\rho$ factor of 0. One can therefore say:

$I^{Black}_r$=Offset$^f_r$ * $G^f_r$
$I^{Black}_g$=Offset$^f_g$ * $G^f_g$
$I^{Black}_b$=Offset$^f_b$ * $G^f_b$ Similarly, if one sets the exposure so as to produce a "good" image of the object 28, and then images a monotone target of known reflectance $\rho_c$ (a white target would prove ideal, with a reflectance of $\rho_c=1$), one can say:

$I^{Reference}_r (x,y)=\rho_c * (P_r(x,y)*G^c_r*G^f_r+\text{Offset}^f_r*G^f_r)$
$I^{Reference}_g (x,y)=\rho_c * (P_g(x,y)*G^c_g*G^f_g+\text{Offset}^f_g*G^f_g)$
$I^{Reference}_d (x,y)=\rho_c * (P_b(x,y)*G^c_b*G^f_b+\text{offset}^f_b*G^f_b)$ In other words, look at a full frame area of uniform reflectance. Ideally, this should be white, but any monotone object will do to obtain spatial calibration data.

Using these results, one can rewrite the equations for the $\rho$ matrices in the following form:

$$\rho_r(x,y) = \frac{(I_r(x,y) - I^{Black}_r)}{I^{Reference}_r(x,y)/\rho_c - I^{Black}_r}$$

$$\rho_g(x,y) = \frac{(I_g(x,y) - I^{Black}_g)}{I^{Reference}_g / \rho_c(x,y) - I^{Black}_g}$$

$$\rho_b(x,y) = \frac{(I_b(x,y) - I^{Black}_b)}{I^{Reference}_b / \rho_c(x,y) - I^{Black}_b}$$

These answers are of course fractional values, whereas one requires integer values where 0 still represents 0 and 255 represents 1. This is accomplished simply by multiplying the above results by 255.

$$\rho'_r(x,y) = \frac{(I_r(x,y) - I^{Black}_r)}{I^{White}_r(x,y) - I^{Black}_r} * 255$$

$$\rho'_g(x,y) = \frac{(I_g(x,y) - I^{Black}_g)}{I^{White}_g(x,y) - I^{Black}_g} * 255$$

$$\rho'_b(x,y) = \frac{(I_b(x,y) - I^{Black}_b)}{I^{White}_b(x,y) - I^{Black}_b} * 255$$

The reflectance/transmissivity matrix and the intensity matrices are functions of x and y. This means that this equation must be applied to every individual pixel; a perfectly valid, but a computationally expensive operation. In order to overcome this potential throughput hazard, the system 30 of FIG. 2 is used.

The correction or calibration method or algorithm of the present invention is as follows for the subsystems:

1. Adjust the framegrabber analog input so that the offset value obtained when grabbing an image from the camera 22 with a completely closed iris is marginally greater than 0. This is to say: the framegrabber offset is measurable. If it returns zero, the offset value could well be negative, and is clamped by the following digitizing electronics.

2. Measure the framegrabber offsets and archive their values.

3. Load the CPMVTs with the values calculated from the following functions:

$$CPMVT_r(a_r, b_r) = \frac{b_r - Offset_r^f}{a_r} * 255$$

$$CPMVT_g(a_g, b_g) = \frac{b_g - Offset_g^f}{a_g} * 255$$

$$CPMVT_b(a_b, b_b) = \frac{b_b - Offset_b^f}{a_b} * 255$$

Figure 3:
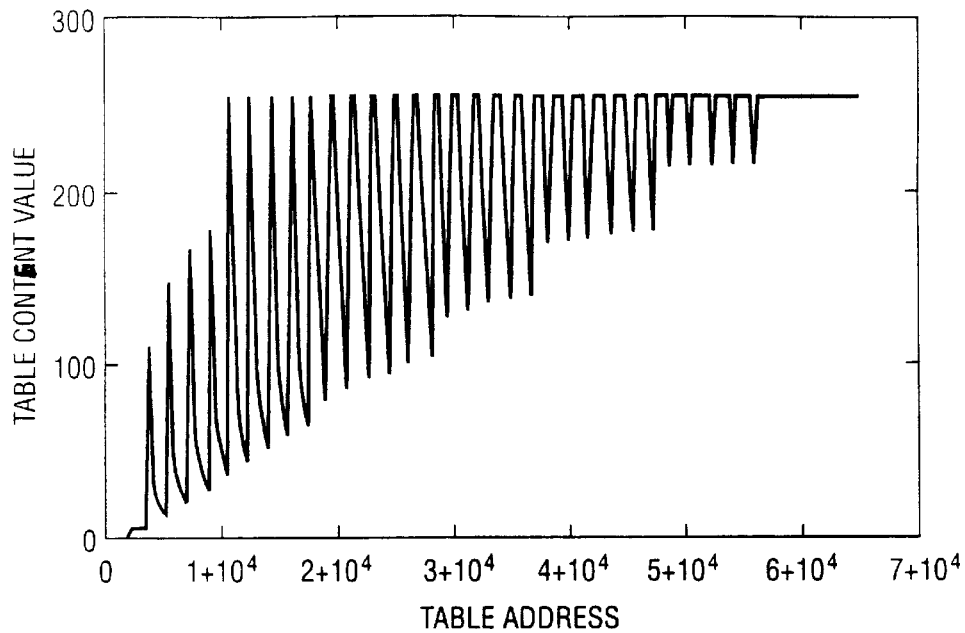
FIG. 3 is a graph illustrating the contents of a correction pixel map vector table (CPMVT) during the method of the present invention.

The values are computed for all possible values of a and b which are all of the positive integer values between 0 and 255. For the situation where a=0, the value of a is replaced by $Offset_x^f$ to prevent the occurrence of a singularity error being generated. These computations completely fill the 65536 bytes of the tables 36. The resulting table contents will look similar to the graph of FIG. 3.

4. Set the switches 42 to point to their constant registers 34 which should each be loaded with the value 255. The camera 22 should be pointed at a target having substantially uniform reflectance (a pure white target ideally) of the same surface texture as the target to be imaged in operation. The output of the camera 22 should then be run through the CPMVTs 36, and the outputs of the tables 36 should be stored back into their corresponding correction buffers 32. It can be seen that this result is numerically equal to the value:

CorrectionBuffer$_r$(x,y)=(I$^{White}_r$(x y)-Offset$^f_r$)
CorrectionBuffer$_g$(x,y)=(I$^{white}_g$(x,y)-Offset$^f_g$)
CorrectionBuffer$_b$(x,y)=(I$^{white}_b$(x,y)-offset$^f_b$)

5. Set the switches 42 to point to their correction buffers 32 and then any image taken through the camera 22 can be corrected for any error in gain whether through: 1) using the camera 22 with incorrectly set illumination color temperature, 2) badly set up camera 22, or 3) incorrect gain settings on the framegrabber 12. Since the correction buffer address is slaved to the pixel address of the input image, these correction factors are applied on a pixel-by-pixel basis, and can also correct for spatially inconsistent illumination, whether it is variation in hue or just variations in intensity.

Setting the switches 42 to point to the constant registers 34 and loading these with the gain constants derived from the algorithm developed in the above-noted application allows this architecture to efficiently compute image correction rather than pixel correction.

The auxiliary pixel map vector table modules 38 allow the corrected image data to be further mapped on a per-color basis. In some respects that could be considered surplus in as much as their effect could be merged into the CPMVTs 36.

However, the reason that they have been left as a separate entity is that oftentimes such a table is needed on a per image acquisition cycle basis—for example color histogramme equalization and matching. To undertake this operation in real-time requires the performance to be optimized. To modify each CPMVT table 36 would require the modification of all 64 K locations, whereas providing the auxiliary table 38 only requires 256 locations to be set up, providing an approximate 200 times speed improvement.

An example of how these tables 38 are used is the process of dynamic white correction. This process is accomplished during system operation by including a small area of white reflectance in the target 28. The area of the image containing this white calibration region is interrogated at regular intervals, and the overall color gains of the individual channels are computed. If the color balance has drifted since the last calibration cycle, perhaps due to a change in the color temperature of the lamp, or camera/framegrabber electronic drift, then the contents of the tables 38 can be updated by the required amount, thus restoring the color balance of the system to its original state. In other words, at any time during an inspection process a small area of white reflectance can be observed. The dynamic white calibration data derived from this segment of the image can be used to correct for any medium to long term temporal variation in imaging conditions.

The tables 36 treat each channel as an independent entity. However, in many color processing algorithms, the color information cannot be treated as independent in this way. Examples where this exception is true are color space translations such as RGB to HIS, or color filtering. To allow these processes to be undertaken, a further stage of processing has been added by providing a pixel map vector color processing table 40 whose addressing sequence is a function of all three color channels. This approach can result in the memory requirements of the machine vision system 10 to escalate very rapidly where very accurate three color processing is required. For example, if the color channels can be digitized to 5 bits per channel, without compromising the accuracy of the required algorithm, the table 40 can be fitted into a 32 K table. If the system must work with "True Color" with all three channels being digitized to 8 bits, this results in the memory requirements reaching a massive 16 Mbyte.

Figure 4:
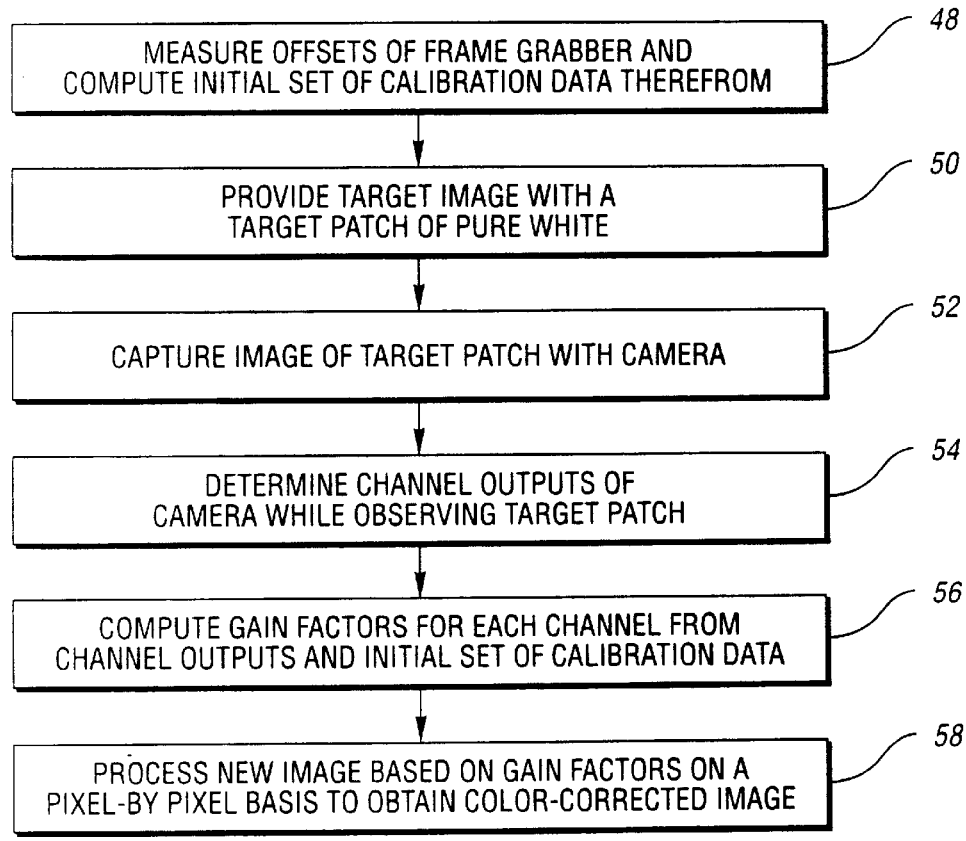
FIG. 4 is a block diagram flow chart illustrating the calibration algorithm or method of the present invention.

Referring to FIG. 4, there is illustrated a simplified block diagram flow chart of the method of the present invention.

At block 48, the offsets of the framegrabber 12 are measured and the computer 16 computes an initial set of calibration data from the offsets which calibration data is then stored in the tables 36 within the computer 16.

One then includes somewhere in an image, a target patch of pure white (i.e. block 50); then, providing this patch can be identified (i.e. block 52), the camera outputs for R, G and B are determined while observing the patch (i.e. block 54). Consequently, one can find the gain for each of the channels. This essentially simplifies to computing the gain factors for each channel from the channel outputs and the initial set of calibration data (i.e. block 56). Applying these three gain factors to the complete image on a pixel-by-pixel basis, one ends up with a color corrected image (i.e. block 58) for each subsequent image.

While the best mode for carrying out the invention has been described in detail, those familiar with the art to which this invention relates will recognize various alternative designs and embodiments for practicing the invention as defined by the following claims.

What is claimed is:

1. A method for automatically calibrating a machine vision system including a color camera having output channels for generating a video signal and a computer having a memory wherein the system introduces an offset to the video signal for each channel, the method comprising the steps of:

measuring the offset for each channel;

generating a first set of calibration data based on the offsets;

providing a calibration target having a monotone region of known reflectance;

utilizing the color camera to generate a target image containing the target with the monotone region for each of the output channels;

measuring an output of each of the output channels during the step of utilizing to obtain output measurements;

computing a second set of calibration data from the output measurements and the first set of calibration data; and storing the second set of calibration data in the memory, the second set of calibration data being applied by the computer to each subsequent image acquired by the color camera on a pixel-by-pixel basis to obtain a color-corrected image.

2. The method as claimed in claim 1 wherein the machine vision system includes a framegrabber and wherein the step of measuring the offset for each channel includes:

measuring an offset of the framegrabber for each channel.

3. The method as claimed in claim 1 further comprising the step of mapping the color-corrected image on a per-color basis.

4. The method as claimed in claim 1 further comprising the step of processing the color-corrected image as a function of the output of the output channels.

5. The method as claimed in claim 1 wherein the color camera is a RGB color camera.

6. A computer-controlled system for automatically calibrating a machine vision system including a color camera having output channels for generating a video signal wherein the machine vision system introduces an offset to the video signal for each channel, the system comprising:

a memory for storing a first set of calibration data and a second set of calibration data;

means for generating a target image containing a calibration target having a monotone region of known reflectance for each of the output channels; and a computer coupled to the memory to measure an offset for each channel and generate the first set of calibration data based on the offsets, to measure an output of each of the output channels to obtain output measurements, to compute the second set of calibration data from the output measurements and the first set of calibration data and to apply the second set of calibration data to each subsequent image acquired by the color camera on a pixel-by-pixel basis to obtain a color-corrected image.

7. The system as claimed in claim 6 wherein the machine vision system includes a framegrabber, and wherein the computer measures an offset of the framegrabber for each channel and generates the first set of calibration data based on the offsets.

8. The system as claimed in claim 6 wherein the computer maps the color-corrected image on a per-color basis.

9. The system as claimed in claim 6 wherein the computer processes the color-corrected image as a function of the output of the output channels.

10. The system as claimed in claim 6 wherein the color camera is a RGB color camera.

11. A method for automatically calibrating a machine vision system including a color camera having output channels and a computer having a memory, the method comprising the steps of:

generating a first set of calibration data based on a black level of each output channel;

generating a second set of calibration data based on the first set of calibration data and a first target image containing a calibration target with a monotone region;

operating the machine vision system utilizing the second set of calibration data to obtain color-corrected images;

generating a third set of calibration data based on a second target image containing a target with a white region during the step of operating; and storing the third set of calibration data in the memory, the third set of calibration data being applied by the computer to each subsequent image acquired by the color camera on a pixel-by-pixel basis to obtain a color-corrected image which is also corrected for medium-to-long term temporal variations in imaging condition.

12. The method as claimed in claim 11 wherein the machine vision system includes a framegrabber and wherein the steps of generating the first set of calibration data includes the steps of:

measuring an offset of the framegrabber for each channel; and generating the first set of calibration data based on the offsets.

13. The method as claimed in claim 11 further comprising the step of mapping the color-corrected image on a per-color basis.

14. The method as claimed in claim 11 wherein the color camera is a RGB color camera.

15. A computer-controlled system for automatically calibrating a machine vision system including a color camera having output channels, the system comprising:

a memory for storing first, second and third sets of calibration data;

means for generating a first target image containing a calibration target having a monotone region for each of the output channels and a second target image containing a target with a white region during operation of the machine vision system;

a computer coupled to the memory to compute the second set of calibration data from the first set of calibration data and the first target image and the third set of calibration data from the second target image and to apply the second and third sets of calibration data to each subsequent image acquired by the color camera on a pixel-by-pixel basis to obtain a color-corrected image which is also corrected for medium to long term temporal variations in imaging conditions.

16. The system as claimed in claim 15 wherein the machine vision system includes a framegrabber, and wherein the computer measures an offset of the framegrabber for each channel and generates the first set of calibration data based on the offsets.

17. The system as claimed in claim 15 wherein the computer maps the color-corrected image on a per-color basis.

18. The system as claimed in claim 15 wherein the color camera is a RGB color camera.

* * * * *